United States Patent
Chisholm

(10) Patent No.: US 10,745,504 B2
(45) Date of Patent: Aug. 18, 2020

(54) MULTI-PART ACRYLIC COLD-CURING COMPOSITION

(71) Applicant: LUCITE INTERNATIONAL SPECIALITY POLYMERS AND RESINS LIMITED, Southampton, Hampshire (GB)

(72) Inventor: Michael Stephen Chisholm, Yarm (GB)

(73) Assignee: LUCITE INTERNATIONAL SPECIALTY POLYMERS AND RESINS LIMITED, Southhampton, Hampshire (GB)

(*) Notice: Subject to any disclaimer, the term of this patent is extended or adjusted under 35 U.S.C. 154(b) by 704 days.

(21) Appl. No.: 15/322,660

(22) PCT Filed: Jul. 8, 2015

(86) PCT No.: PCT/GB2015/051972
§ 371 (c)(1),
(2) Date: Dec. 28, 2016

(87) PCT Pub. No.: WO2016/005742
PCT Pub. Date: Jan. 14, 2016

(65) Prior Publication Data
US 2017/0137554 A1 May 18, 2017

(30) Foreign Application Priority Data

Jul. 10, 2014 (GB) .................... 1412263.4

(51) Int. Cl.
| C08F 265/06 | (2006.01) |
| C08L 33/06 | (2006.01) |
| C09J 4/06 | (2006.01) |
| B29C 39/00 | (2006.01) |
| B29C 39/02 | (2006.01) |
| B29C 39/44 | (2006.01) |
| G01N 1/36 | (2006.01) |
| B29K 33/04 | (2006.01) |
| B29K 105/16 | (2006.01) |

(52) U.S. Cl.
CPC .......... C08F 265/06 (2013.01); B29C 39/003 (2013.01); B29C 39/02 (2013.01); B29C 39/44 (2013.01); C08L 33/06 (2013.01); C09J 4/06 (2013.01); G01N 1/36 (2013.01); *B29K 2033/04* (2013.01); *B29K 2105/16* (2013.01); *G01N 2001/366* (2013.01)

(58) Field of Classification Search
CPC .............. C08F 2220/1808; G01N 1/36; G01N 2001/366
See application file for complete search history.

(56) References Cited

U.S. PATENT DOCUMENTS

| 4,104,333 A | * | 8/1978 | Lee, Jr. ................ A61K 8/8152 424/61 |
| 4,264,489 A | | 4/1981 | Ibsen et al. |
| 5,080,583 A | | 1/1992 | Hunting |
| 5,650,108 A | | 7/1997 | Nies et al. |

FOREIGN PATENT DOCUMENTS

| CN | 101595138 A | 12/2009 |
| EP | 0088845 A2 | 9/1983 |
| EP | 2502942 A1 | 9/2012 |
| GB | 1110673 A | 4/1968 |
| RU | 2128523 C1 | 4/1999 |
| SU | 728993 A1 | 4/1980 |
| WO | 02/058592 A2 | 8/2002 |
| WO | 2009007254 A1 | 1/2009 |
| WO | 2010/018412 A1 | 2/2010 |
| WO | 2010018412 A1 | 2/2010 |
| WO | 2013/144590 A1 | 10/2013 |
| WO | 2015/044688 A1 | 4/2015 |

OTHER PUBLICATIONS

International Search Report for PCT/GB2015/051972 dated Sep. 16, 2015 (5 pages).
H.G. Yuan, G. Kalfas, and W.H. Ray; "Suspension Polymerisation"; JMS-REV. Macromol. Chem. Phys.; C31(2&3); p. 215-299 (1999).

* cited by examiner

Primary Examiner — Mark S Kaucher
(74) Attorney, Agent, or Firm — Shumaker, Loop & Kendrick, LLP

(57) ABSTRACT

A multi-part acrylic cold curing composition for metallography moulds to produce a metallography mount is described. The composition has a storage stable solid part and a storage stable liquid part. The parts are operable to form a mixture which polymerises to a solid mass upon mixing of the parts together. The solid part comprises polymer powder and initiator and the liquid part comprises acrylic monomer and optionally activator or accelerator. The initiator is present in an amount effective to polymerize the acrylic monomer component upon being mixed with the liquid part. The composition comprises a cyclic ester side group containing monofunctional acrylic monomer. The composition liquid part may contain a mixture of monofunctional monomer(s) and polyfunctional monomer(s), wherein the polyfunctional monomers comprise between 12 and 22% w/w of the total monomers in the uncured composition. Metallography mounts and processes for producing the mounts are also described.

33 Claims, No Drawings

MULTI-PART ACRYLIC COLD-CURING COMPOSITION

TECHNICAL FIELD AND BACKGROUND OF THE INVENTION

The present invention relates to a multi-part, typically, two-part cold curing composition for use in metallography to produce metallography mounts and, in particular but not exclusively to one which utilises cyclic ester side group containing acrylic monomers.

Metallographic study, or metallography, also known as metallographic encapsulation is the examination of macro- and microstructural features on prepared surfaces of materials. Specimens to be examined by metallography are typically prepared by firstly encapsulating each specimen within a plastic mount to facilitate handling during sample preparation. This is particularly important for specimens that need perfect edge retention or protection of layers. Mount sizes typically range from about 25 mm to 75 mm in diameter. After mounting in resin, sample preparation then consists of grinding and then polishing using successively finer abrasives to obtain the desired surface finish. For microstructure examination, a mirror finish is needed, but a finely-ground finish is adequate for macrostructure evaluation. Chemical or other etching methods are often used to delineate macro- and microstructural features. Once prepared, samples are examined by the unaided eye, light microscopy, and/or electron microscopy.

Two types of mounting techniques are used-hot compression mounting (also called hot mounting) and cold mounting. The choice of mounting technique to use depends on several factors, such as the number of samples to examine, the quality required and cost.

Hot mounting requires the use of a metallurgical mounting press. It produces hard mounts for encapsulating metallurgical samples in short cycle times and is ideal for a regular succession of incoming samples. The resulting mounts are high quality, uniform size and shape, and require a short process time.

Cold mounting is suitable for a large series of samples coming to the lab simultaneously, and also for single samples. Cold mounting is especially suited for mounting specimens that are sensitive to heat or pressure. Additionally, cold mounting does not require an investment in a mounting press and is therefore good for infrequent mounting tasks. Some cold mounting resins can be used for vacuum impregnation.

The three main types of resins used in cold mounting are epoxy resins, acrylic resins and polyester resins. All are supplied as two part systems. Epoxy and polyester systems involve resin and hardener. Acrylic systems utilize acrylic resin powder and liquid monomer. Resin curing involves an exothermic reaction and it is important to mix the correct proportions of constituents to produce mounts of high quality.

Acrylic systems have the particular advantages of being easy to use and provide short curing times. They are well-suited for both serial mounting of irregularly shaped specimens and for routine work or single specimens.

It is the field of acrylic resins and monomers for cold mounting that this invention is concerned with. The cold mounting process involves the cold curing (also known as self-curing or autopolymerising) of the liquid monomer when combined with acrylic resin powder at ambient temperature.

Acrylic resins for metallography applications are well known. The solid part generally comprises a homopolymer or copolymer of either methyl methacrylate (MMA), ethyl methacrylate (EMA), iso-butyl methacrylate (iBMA) or n-butyl methacrylate (nBMA).

The liquid part generally comprises monofunctional methacrylate monomers such as MMA, EMA, iBMA or nBMA either on their own or as a mixture of two or more. Crosslinking monomers may also be present as part of the liquid part, such as ethylene glycol dimethacrylate.

Unfortunately, monofunctional methacrylate monomers such as MMA, EMA, iBMA and nBMA suffer from problems that make them unattractive for use in cold mounting applications. For example, they tend to have a relatively high odour compared to epoxy resins and polyester resins. Additionally, they fall within a class of materials that is rated as flammable and hazardous for transport, thereby necessitating special transport arrangements and storage in particular areas. These factors lead to increased costs and higher operating standards when using such materials.

Odour problems can be reduced by using higher molecular weight monofunctional methacrylate monomers such as 2-ethyl hexylmethacrylate, octylmethacrylate or dodecyl methacrylate, but these have the disadvantage of increasing the time for the solid/liquid combination to polymerise and set. Also, the resultant mount is rather soft due to a combination of reduced glass transition temperature (Tg) and the conversion of monomer to polymer being lower.

Functional monomers such as methacrylic acid or hydroxyalkyl methacrylates such as hydroxyethyl methacrylate or hydroxypropyl methacrylate may be considered. The volatility of these monomers is lower than monofunctional methacrylate monomers such as MMA, EMA, iBMA and nBMA, and they therefore have lower odour, but they bring other problems to the application. For example, methacrylic acid is corrosive (therefore requiring special handling) and it is a solid at temperatures below 15° C. Hydroxyethyl methacrylate and hydroxypropyl methacrylate are potential skin sensitisers.

U.S. Pat. No. 5,080,583 describes a two component acrylic monomer-polymer system for making an orthodontic appliance through a cold cure approach, i.e. by mixing the two components together at ambient temperature and allowing them to harden under the action of initiator and activator or accelerator. A fragrance oil is also added to provide a pleasant taste and smell to the orthodontic appliance. Additionally, metallic hardware is embedded in the acrylic base such that the embedded hardware extends outward to contact the patient's mouth when the device is in position in the patient's mouth. However, U.S. Pat. No. 5,080,583 does not embed the metallic hardware with a view to metallographical study. Additionally, it teaches the use of methyl methacrylate in the liquid part, a monomer that has the problem of volatility, odour and flammability if used for metallography, as detailed above.

EP2502942, discusses use of a single part dual initiator UV and heat cure composition. The document teaches the avoidance of peroxide initiators and the use of azo initiators for heat curing. The single part composition replaces 2-part (2-K) systems which are said to cause a lack of transparency and require high pressure.

SUMMARY OF THE INVENTION

Surprisingly, it has been has found that an improved combination of desirable features for metallography such as fast setting, hardness and clarity combined with reduced odour, improved ease of use and transportation can be achieved by using monofunctional methacrylate monomers having cyclic ester side groups in a multi-part acrylic system.

According to a first aspect of the present invention there is provided a multi-, preferably, two-part acrylic cold curing composition for metallography moulds to produce a metallography mount comprising a storage stable solid part and a storage stable liquid part, the parts being operable to form a mixture which polymerises to a solid mass upon mixing of the parts together, the solid part comprising polymer powder and initiator and the liquid part comprising acrylic monomer and optionally activator or accelerator, the initiator component being present in an amount effective to polymerize the acrylic monomer component upon being mixed with the liquid part characterized in that the acrylic monomer component comprises a cyclic ester side group containing monofunctional acrylic monomer.

According to a second aspect of the present invention there is provided a multi-, preferably, two-part cold curing pack for metallography moulds to produce a metallography mount comprising a first container and a second container, the content of the said first and second containers being in accordance with the solid and liquid parts respectively of the first aspect of the invention.

According to a third aspect of the present invention, there is provided a cold curing composition according to the first aspect of the present invention or a pack according to the second aspect of the present invention for use as a cold mounting metallography moulding composition to produce metallography mounts.

DETAILED DESCRIPTION

Suitable cyclic ester side group containing monofunctional acrylic monomers are preferably methacrylate monomers and include cyclic aliphatic ester methacrylate monomers and aryl ester methacrylate monomers. The monofunctional methacrylate monomers having a cyclic aliphatic ester group may be selected from cyclohexyl methacrylate, isobornyl methacrylate, dicyclopentenyl methacrylate, dihydrodicyclopentadienyl methacrylate, adamantyl methacrylate, 4-t-butylcyclohexyl methacrylate, 3,3,5-trimethylcyclohexyl methacrylate and tetrahydrofurfuryl methacrylate. The monofunctional aryl ester methacrylate monomers may be selected from benzyl methacrylate, 2-phenoxyethylmethacrylate and phenyl methacrylate. Optionally, the monofunctional monomer used in the liquid part may comprise a mixture of more than one monofunctional acrylic monomer.

Typically, the cyclic ester side group containing monofunctional monomer component comprises between 10 and 100% w/w of the total monomers in the uncured composition, more typically between 50 and 98% w/w, most typically, between 70 and 96% w/w. Generally, the balance of monomers is made up of polyfunctional and, optionally, other monofunctional monomers as set out herein. Accordingly, typically, the polyfunctional monomers described herein may comprise between 0 and 90% w/w of the total monomers in the uncured composition, more typically between 2 and 50% w/w, most typically, between 4 and 30% w/w.

The cyclic ester side group containing monofunctional monomer or residue thereof may comprise between 70 and 98% w/w of the total monomers in the uncured composition liquid part or monomer residues of the acrylic polymer, typically, between 75 and 96% w/w, or between 80 and 96%, more typically between 75 and 90% w/w or between 78 and 88% w/w.

Typically, the polyfunctional monomers or residues thereof comprise between 2 and 30% w/w of the total monomers in the uncured composition or monomer residues forming the acrylic polymer, more typically between 4 and 25% w/w, or between 4 and 20% w/w, most typically between 10 and 25% w/w or between 12 and 22% w/w.

Typically, the acrylic monomer component comprises between 80 and 100% w/w of the liquid part, more typically, between 90.0 and 99.8% w/w, most typically, between 92.5 and 99.5% w/w. The balance of the liquid part is typically made up of further additives as detailed herein.

Accordingly, the activator or accelerator comprises between 0 and 10% w/w of the liquid part, more typically, between 0.2 and 7.5% w/w, most typically, between 0.5 and 5% w/w, An especially preferred level of activator or accelerator is above 2.0% w/w of the liquid part.

Typically, the solid and liquid parts comprise 90-100% w/w of the composition, more typically, about 100% w/w of the composition.

Preferably, the solid part comprises a polymer powder and polymerisation initiator(s) and, optionally, further additives, such as catalysts, fillers, pigments and dyestuffs. Preferably the liquid part comprises a liquid monomer or monomers and, optionally, in addition to optional activator or accelerator, further additives, such as stabilisers, fillers, pigments and dyestuffs.

When ready for use, the solid and liquid parts are mixed together, typically at ambient temperature and atmospheric pressure to form a pourable mixture that is poured into the mounting cup containing the specimen to be encapsulated. Generally, the action of the mixing of the polymerisation initiators and activators or accelerators causes the mixture to increase in viscosity and harden into a solid.

When the solid and liquid parts are mixed together they form a liquid or semi-solid paste, which, under the action of the polymerisation initiators and accelerators, increases in viscosity and hardens into a solid. Initially, the polymer particles are wetted with monomer, solvated and begin to dissolve. The solvated polymer particles may release any encapsulated initiator such as dibenzoyl peroxide initiator into the monomer and/or added initiator may mix into the monomer which interacts with activator or accelerator, if present, to produce radicals that react with the monomer and initiate room temperature addition polymerisation of the monomer. The mixture starts out at a relatively low viscosity and progresses to a stiffer and stiffer system that eventually hardens completely.

Preferably, the composition of the invention has a set time under cold cure conditions of less than 60 minutes, more preferably, less than 40 minutes, most preferably, less than 30 minutes.

The liquid part monomer component may comprise polyfunctional monomer in addition to monofunctional monomer. Such polyfunctional monomers have at least two polymerisable double bonds per molecule. Examples of suitable bifunctional monomers include: ethylene glycol dimethacrylate, hexanediol dimethacrylate, tripropylene glycol dimethacrylate, butanediol dimethacrylate, neopentyl glycol dimethacrylate, diethylene glycol dimethacrylate, triethylene glycol dimethacrylate, dipropylene glycol dimethacrylate, allyl methacrylate, divinyl benzene and substituted analogues thereof. Trifunctional examples include: tripropylene glycol trimethacrylate, trimethylol propane trimethacrylate, pentaerythritol trimethacrylate.

Tetrafunctional monomers such as pentaerythritol tetramethacrylate and hexafunctional monomers eg. dipentaerythritol hexamethacrylate may also be used. Optionally, the polyfunctional monomer may comprise a mixture of more than one polyfunctional compound.

As mentioned above, other monofunctional monomers may also be present. Typically, the other monofunctional monomers comprise between 0 and 20% w/w of the total monomers in the uncured composition, more typically between 0 and 10% w/w, most typically, between 0 and 5% w/w. Generally, however, such other monofunctional monomers are not present in the composition. Typically, such other monomers may be acrylic or vinylic monomers, for example, methyl methacrylate, ethyl methacrylate, iso-butyl methacrylate and n-butyl methacrylate.

Preferably the liquid part comprises a mixture of monofunctional monomer(s) and polyfunctional monomer(s). The ratio of monofunctional monomer to polyfunctional monomer (when present) in the liquid part is preferably between 99.9:0.1 wt % and 50:50 wt %, more preferably between 97:3 wt % and 60:40 wt and most preferably between 95:5 wt % and 70:30 wt %.

Preferably, the polymer powder is selected from a polymer or copolymer having >100 monomer residue units. Accordingly, the polymer powder of the invention is generally not an oligomer which may be defined as having 5-50 monomer residue units.

The polymer powder of the invention is generally a homopolymer of a polyalkyl(alk)acrylate or (alk)acrylic acid or copolymer of a polyalkyl(alk)acrylate or (alk)acrylic acid with one or more other vinyl monomers. Typically, the polymer powder is a homopolymer of methyl methacrylate, ethyl methacrylate, iso-butyl methacrylate or n-butyl methacrylate or a copolymer of methyl methacrylate, ethyl methacrylate, iso-butyl methacrylate or n-butyl methacrylate with one or more other vinyl monomers. By other vinyl monomers is meant a further (i.e. different) alkyl(alk)acrylate or (alk)acrylic acid such as, unless mutually excluded, ethyl methacrylate, methyl acrylate, ethyl acrylate, n-butyl acrylate, iso-butyl acrylate, t-butyl acrylate, n-butyl methacrylate, iso-butyl methacrylate, t-butyl methacrylate, 2-ethylhexy methacrylate, 2-ethylhexyl acrylate, lauryl methacrylate, lauryl acrylate, cyclohexyl acrylate, cyclohexyl methacrylate, isobornyl acrylate, isobornyl methacrylate, methacrylic acid, acrylic acid; hydroxyl-functional acrylates such as 2-hydroxyethyl methacrylate, hydroxypropylethyl methacrylate, 2-hydroxyethyl acrylate, or hydroxypropyl acrylate; vinyl compounds such as styrene, vinyl pyrrolidinone, vinyl pyridine; and compatible crosslinking monomers such as allyl methacrylate, divinyl benzene, ethylene glycol dimethacrylate, ethylene glycol diacrylate, 1,4-butanediol dimethacrylate, 1,4-butanediol diacrylate, 1,6-hexanediol dimethacrylate and 1,6-hexanediol diacrylate, particularly the compatible acrylic crosslinking monomers.

The polymer powder may also be a mixture of one or more of the above homopolymers or copolymers.

Particularly preferred polymer powders are homopolymers of methyl methacrylate, ethyl methacrylate, iso-butyl methacrylate or n-butyl methacrylate and copolymers thereof, preferred copolymers being methyl methacrylate with ethyl methacrylate, iso-butyl methacrylate or n-butyl methacrylate and ethyl methacrylate with n-butyl methacrylate.

Generally, the polymer powder is not derived from non-vinylic monomers such as polyols and isocyanates used to produce urethanes, and is generally derived exclusively from vinylic monomers.

Typically, the polymer powder comprises between 60 and 99.9% w/w of the solid part, more typically, between 70 and 99.7% w/w, most typically, between 80 and 99.5% w/w. The balance of the solid part is typically made up of further additives as detailed herein. Accordingly, the initiator comprises between 0.1 and 15% w/w of the solid part, more typically, between 0.3 and 10% w/w, most typically, between 0.5 and 6% w/w.

Generally, the acrylic monomer component comprises about 100% w/w of the total monomers in the uncured composition and makes up at least 95% w/w of the liquid part, more typically, at least 97% w/w of the liquid part. In addition, the polymer powder may comprise at least 90% w/w of the solid part, more typically, at least 95% w/w of the solid part.

In preferred embodiments, it will be appreciated that the lower and upper limits for the levels of the polymers, monomers and initiators and other additives herein may be combined in any combination within the context of the invention. However, in a particularly preferred embodiment, composition is a two part composition, the acrylic monomers comprise at least 95% w/w of the total monomers in the uncured composition, the monomers comprise at least 95% of the liquid part and the polymer powder comprises at least 95% w/w of the solid part, more typically, the embodiment levels are all at least 97% w/w.

The polymer powder may be prepared using any suitable known polymerisation method, such as, but not limited to: bulk, suspension, emulsion, solution polymerisation or any derivative thereof.

Preferably the polymer powder is prepared by suspension polymerisation. Suspension polymerisation of acrylic monomers is well known and has been described in a number of literature reviews, for example Suspension Polymerisation; H. G. Yuan, G. Kalfas, and W. H. Ray; JMS-REV, Macromol. Chem. Phys.; C31 (2&3); 215-299; 1991.

Suspension polymerisation involves the polymerisation of monomers in a dispersed phase. The continuous phase is normally water. Suitable dispersing agents are well known in the art and include modified cellulose polymers (e.g. hydroxyethyl, hydroxypropyl, hydroxypropyl methyl), polyacrylic acid, polymethacrylic acid, partially and fully neutralised versions of these acids, poly(vinyl alcohol), poly(vinyl alcohol-co-vinyl acetate) copolymers amongst others. The dispersion of monomers in the continuous phase is normally agitated at high speed throughout the polymerisation process to help keep the dispersion stable, to enable good heat transfer between the continuous phase and the dispersed droplets or particles and to control bead particle size.

As the polymerisation proceeds, the monomers in the dispersed phase react to form polymer which remains in the dispersed phase in spherical bead form. The reaction temperature may vary according to the type of monomers and initiator which are used and is typically between 20 and 150° C., for example in the range 50-120° C. The mean particle size of the resultant polymer beads is typically between 10 microns and 800 microns, for example in the range 15 to 600 microns.

In any case, the preferred mean particle size range of the polymer powder of the present invention is 20 to 200 microns, preferably 30 to 150 microns, more preferably 35 to 80 microns. Mean particle size may be determined using a Coulter LS230 laser diffraction instrument.

The weight average molecular weight (Mw) of the polymer powder of the present invention is typically, between 25,000 daltons and 3,000,000 daltons, more typically, between 100,000 daltons and 1,500,000 daltons, preferably, between 150,000 and 1,000,000, for instance, between 200,000 and 600,000. Molecular weight may be determined for this purpose by gel permeation chromatography (GPC).

Molecular weight may be controlled by the techniques known to the skilled person, for example, by varying the reaction temperature or by altering the concentration of initiator or by use of a chain transfer agent.

Examples of chain transfer agents for control of molecular weight include: thiol compounds, cobalt compounds, alphamethyl styrene dimer, and aliphatic alcohols. The thiol compounds include monofunctional and multifunctional thiols. Monofunctional thiols include, but are not limited to, propyl mercaptan, butyl mercaptan, hexyl mercaptan, octyl mercaptan, dodecyl mercaptan, thioglycollic acid, mercaptopropionic acid, alkyl thioglycollates, for example: 2-ethylhexyl thioglycollate, or octylthioglycollate, mercaptoethanol, thiolactic acid and thiobutyric acid. Multifunctional thiols include di, tri, tetra and higher functionality thiols.

Examples of suitable initiators include: azo compounds, peroxides, peroxyesters and persulfates, specifically, azobis(isobutyronitrile), azobis(2-methylbutyronitrile), azobis(2,4-dimethylvaleronitrile), azobis(4-cyanovaleric acid), dilauroyl peroxide, tert-butyl peroxyneodecanoate, dibenzyl peroxide, cumyl peroxide, tert-butylperoxy-2-ethyl hexanoate, tert-butyl peroxydiethyl acetate, tea-butyl peroxy benzoate, tea-butyl hydroperoxide, potassium persulphate, ammonium persulphate and sodium persulphate. The preferred initiator is dibenzoyl peroxide. The polymerization normally proceeds in such a way that there is an excess of initiator required to complete the polymerization. The residual initiator is encapsulated within the polymer particles at the end of the polymerization and is available for subsequent reaction when mixed with the liquid part during the metallography process. When the solid and liquid parts are mixed together, the polymer particles are wetted with monomer, solvated and begin to dissolve. The solvated polymer particles release initiator such as dibenzoyl peroxide initiator into the monomer which interacts with activator or accelerator, if present, to produce radicals that react with the monomer and initiate room temperature addition polymerisation of the monomer. The mixture starts out at a relatively low viscosity and progresses to a stiffer and stiffer system that eventually hardens completely.

Typically, the amount of residual and/or added initiator may be between 0.1 to 10% w/w of the solid part.

The ratio of solid to liquid part is typically in the range 1:2 to 4:1 by weight, more typically, 1:1 to 3:1 by weight, most typically, 1:0.8 to 2.5:1 by weight.

The temperatures at which the solid and liquid parts are mixed together and at which polymerisation is therefore initiated may be those suitable for cold cure formulations and is typically ambient temperature, for example 10-35° C., more typically, 15-30° C., most typically 18-25° C.

Before mixing, the components are usually equilibrated for a suitable period, typically, 1 hour or more at the mixing temperature.

Multi-part compositions of the present invention which are operable to form a mixture which polymerises to a solid mass upon mixing of the parts together are generally termed hardenable compositions.

A general procedure for mixing the parts of the hardenable composition of the invention is described as follows: Before mixing, the two components are equilibrated for a suitable period, typically, 1 hour or more at a temperature of 5-40° C., more typically, 10-35° C., most typically, 15-30° C. Mixing is then carried out at the equilibrated temperature for at least 5, more typically, at least 20, most typically, at least 30 seconds. When the mixture is well mixed, the low viscosity material is poured into place in the mould containing the sample preconditioned at an appropriate temperature generally in the range of the equilibration temperatures above and allowed to exotherm and harden.

The mixing of the two components and subsequent reaction can be carried out at the equilibration temperatures. The skilled person will be aware of the effect of temperature on the set times. Higher equilibration and mixing temperature leads to shorter set times and vice versa for lower equilibration and mixing temperature.

The preferred pressure for the polymerisation of the two parts together may be those suitable for cold cure formulations such as atmospheric pressure, i.e. open to the atmosphere when curing. However, it is possible to carry out the curing under mild pressure. A typical pressure for the reaction of the polymer and monomer parts of the invention is 0.87 bar to 12.0 bar, more preferably 0.87 bar to 7 bar, most preferably, 0.87 bar to 3 bar.

The preparation of a mount from the mixing of the acrylic composition solid part and the liquid part can be carried out in various ways that will be appreciated by those skilled in the art, for example by hand mixing.

The liquid part of the invention typically comprises one or more monomers as defined above with, optionally, a suitable inhibitor such as hydroquinone (HQ), methyl hydroquinone (MeHQ), 2,6-di-tertiary-butyl-4-methoxyphenol (Topanol O) and 2,4-dimethyl-6-tertiary-butyl phenol (Topanol A). The inhibitor is present to prevent the monomer from spontaneously polymerising.

Polymerisation activators or accelerators may also be present in the liquid part, such as tertiary amines, for example, N,N-dimethyl-p-toluidine (DMPT) and N,N-dihydroxyethyl-p-toluidine (DHEPT) or organic-soluble transition metal catalysts.

Other type of polymerisation activators or accelerators are barbituric acid compounds in combination with transition metal salts, for example, as described in GB1,110,673. Such activators or accelerators may not be completely contained in the liquid part but can have a storage stable first component in the solid part which becomes active upon mixing of the component with a second activator or accelerator component in the liquid part. For example, typically, 0.1 wt % to 2.0 wt % of barbituric acid compound such as 1-Benzyl 5-phenylbarbituric acid may be present in the solid part and 0.005 wt % to 0.05 wt % of copper compound such as copper acetyl acetonoate is dissolved in the liquid part. Accordingly, in one set of embodiments of the present invention a first component of the activator or accelerator is present in the storage stable solid part together with initiator and preferably, a second complementary activator or accelerator component is present in, more preferably, dissolved in, the liquid part. By complementary herein is meant a component that when mixed with its complementary component forms the required activator or accelerator.

Tertiary amine polymerisation activators or accelerators may be present in the liquid part in the range 0.1 to 5% by mass, more typically, 0.5-3% by mass.

Suitable initiators for the multi-part composition may be selected from those effective to polymerise the composition under cold cure conditions such as the temperatures and pressures given above. Typical initiators whether residual to the polymer powder polymerisation, added to the solid polymer component or both residual and added to the solid part may be selected from those given above for the monomers of the solid polymer component Preferred initiators are selected from the peroxides given above. If present, residual initiator will be present in the solid part. If added initiator is utilised this is also preferably present in the solid part.

Although mixtures of initiators are possible, it is preferred that a single initiator is used. In any case, the process of production of the mount is typically a single cure process.

In preferred embodiments, an amount of initiator effective to polymerise the composition is present in the solid part and an amount of activator or accelerator effective to activate the initiator is present in the liquid part.

As detailed herein, the initiator component is present in an amount effective to fully polymerize the monomer component, for example, to at least polymerize 85% w/w of the monomer component, more typically, at least 90% w/w, most typically, 95%-98% w/w of the monomer component. In addition, the initiator component may be present in excess of the amount that would be effective to fully polymerize the monomer component.

Variation in the amount of encapsulated residual initiator or added initiator (e.g. dibenzoyl peroxide) has the effect of varying the set time of the multi-component acrylic system. Increased initiator level results in shortened set time. Additionally, variation of the amount of activator or accelerator (e.g. DMPT) in the liquid part can also affect the set time. Increased activator or accelerator concentration results in shortened set time.

The solid part typically used comprises small spherical beads (usually about mean particle size 20-150 microns in diameter) of acrylic polymer and a small amount of polymerisation initiator such as dibenzoyl peroxide (BPO), usually encapsulated within the acrylic polymer bead, but which can also be added as a separate component. The liquid part comprises a monomer, typically a methacrylate monomer, and may also contain a polymerisation activator or accelerator such as N, N-dimethyl-p-toluidine (a tertiary amine) (DMPT) and preferably, an inhibitor such as hydroquinone (HQ) to prevent the monomer from spontaneously polymerising.

Definitions

When the solid and liquid parts of the present invention are mixed together, the acrylic polymer particles in the solid part are wetted with monomer from the liquid part, solvated and begin to dissolve. The solvated polymer particles may then release initiator. Released and/or added initiator then comes into contact with the monomer optionally interacting with activator or accelerator from the liquid part to produce radicals that react with the monomer and initiate room temperature addition polymerization of the monomer. The mixture starts out as a relatively low viscosity fluid and progresses to a stiffer and stiffer system that eventually hardens completely to its final set composition.

This constantly changing viscosity of the fluid is characterised by a set time and maximum exotherm temperature attained, as defined by BS ISO 5833:2002. The set time is considered to be the time taken to reach a temperature midway between ambient and maximum.

The set time and maximum exotherm temperature are parameters that determine how the hardenable compositions are to be used. Compositions hardenable from room temperature (so-called "self-curing" or "cold-curing" systems or autopolymerising systems) have set times that are typically 5 to 30 minutes in duration.

Accordingly, by "self-curing" or "cold-curing" or the like herein is meant curing/polymerisation that is essentially triggered at ambient temperature by mixing of the two or more parts of a multiple part composition together. In this context, the term distinguishes the invention from compositions that require additional means to trigger the curing/polymerisation such as UV treatment or heat treatment.

In the present invention, the separate components are storage stable and are activated by mixing. By "storage stable" is meant that the monomer or liquid does not polymerize under normally acceptable storage conditions of temperature and time i.e. between 5 and 30° C. and 1 to 250 days, more typically, 15 to 25° C. and 1 to 170 days.

The term "liquid" herein does not require definition because it is well understood by the skilled person. Typically, the term liquid is applicable to the material or composition at least between 5 and 35° C., more typically, between 5 and 30° C.

The term "solid part" means a non-liquid or non-gaseous part and is generally a free flowing dry particulate material usually made up of one or a mixture of powder(s) and not including a liquid carrier.

By "alkyl" herein is meant $C_1$-$C_{13}$ alkyl wherein the term alkyl and alk encompasses cycloalkyl and hydroxyl functional $C_1$-$C_{18}$ alkyl. By alk herein is meant $C_0$-$C_8$ alk.

By "copolymer" herein is included terpolymer, pentapolymers and the like and the term should not be taken as restricted to polymers derived from only two types of monomer.

As indicated, the composition may include more than two parts, for instance the initiator component and/or any of the monomers could be stored in a separate third part but for convenience the multi-part acrylic composition of any of the aspects or preferred features of the invention herein is typically only a two-part composition, i.e. there is no third or further part.

According to a further aspect of the present invention there is provided a process of producing a metallography mount comprising the steps of:— mixing a solid part and a liquid part according to any of the aspects of the present invention together to form a liquid or semi-solid paste;

pouring the liquid or semi-solid paste into a mould containing a metallography sample to be analysed to at least partially encapsulate the sample;

allowing the liquid or semi-solid paste to harden around the sample; and optionally, releasing the mounted metallography sample from the mould for analysis or further preparation.

The invention extends in another aspect to a solid metallography mount produced from mixing a multi-part acrylic composition according to any of the aspects herein.

Preferably, the Shore D hardness of the solid produced by mixing the said parts in any aspect of the present invention is greater than 70, more preferably greater than 72. The typical range of Shore D hardness found in the produced solid is 70-94, more preferably, 75-94 using, in any case, a durometer according to ASTM D2240.

EXAMPLES

Characterisation Techniques:

% wt residual dibenzoyl peroxide content of the acrylic polymer beads is determined by a titration method.

The mean particle size of the acrylic polymer beads is determined using a Coulter LS230 laser diffraction instrument.

Molecular weight is determined by gel permeation chromatography (GPC) using tetrahydrofuran solvent and a refractive index detector calibrated using poly(methyl methacrylate) standards.

End of pour time is the length of time from the start of mixing solid and liquid components together until the mixture is too viscous to pour from the mixing container.

Shore D hardness is measured using a durometer according to ASTM D2240.

Preparative Method:

General description of method used to prepare acrylic cold mounting system.

Acrylic polymer solid and monomer liquid components plus relevant equipment such as beakers, measuring cylinders, spatulas, etc. are conditioned in an incubator at 23° C. before use.

10 g of acrylic polymer solid is weighed into a 30 ml capacity plastic beaker and the desired amount of monomer liquid is weighed into a 10 ml capacity glass measuring cylinder. The monomer liquid is then poured into the beaker containing the acrylic polymer solid and mixed for 30 seconds using a spatula. The rate of mixing is relatively slow to minimize the inclusion of air bubbles. After 30 seconds mixing, approximately half the mixture is poured into a 25 mm diameter plastic mounting cup and left to harden at 23° C. The remainder of the mixture is left in the plastic mixing beaker at 23° C. to determine the pour time and set time. The viscosity of the mixture steadily increases with time, an exotherm occurs and the mixture transforms into a hard glassy casting.

After undergoing an exotherm, the casting in the plastic mounting cup is allowed to cool overnight before testing for Shore D hardness and visible assessment of clarity, colour and relative amount of trapped bubbles compared to a control.

Examples 1 to 4 and Comparative Examples A and B

The acrylic polymer solid used for examples 1 to 4 and comparative examples A and B was a copolymer of ethyl methacrylate (EMA) and methyl methacrylate (MMA) made by suspension polymerisation using dibenzoyl peroxide (BPO) as initiator. The copolymer composition was 80 wt % EMA and 20 wt % MMA. The mean particle size of the poly(EMA-co-MMA) bead polymer particles was 55 microns and the amount of residual BPO was 2.2 wt %. The weight average molecular weight (Mw) was 274,000 daltons.

The acrylic monomer liquid used for examples 1 to 4 was a mixture with composition: 88.75 wt % isobornyl methacrylate (iBoMA), 10 wt % triethylene glycol dimethacrylate (TEGDMA) and 1.25 wt % N,N-dihydroxyethyl-p-toluidine (DHEPT).

Examples 1 to 4 vary in the amount of acrylic monomer liquid used to mix with 10 g of the poly(EMA-co-MMA) bead polymer.

Comparative examples A and B are control mounts made using an acrylic system typical of that already known in the metallography market.

Specifically, comparative example A is produced by mixing an acrylic monomer liquid of composition: 76.25 wt % n-butyl methacrylate, 12.50 wt % ethyl methacrylate, 10 wt % triethylene glycol dimethacrylate and 1.25 wt % N,N-dihydroxyethyl-p-toluidine (DHEPT) with poly(EMA-co-MMA) bead polymer in the ratio of 6 g of the acrylic monomer liquid to 10 g the poly(EMA-co-MMA) bead polymer.

Comparative example B is produced by mixing an acrylic monomer liquid of composition: 71.25 wt % n-butyl methacrylate, 12.50 wt % ethyl methacrylate, 15 wt % triethylene glycol dimethacrylate and 1.25 wt % N,N-dihydroxyethyl-p-toluidine (DHEPT) with poly(EMA-co-MMA) bead polymer in the ratio of 6 g of the acrylic monomer liquid to 10 g the poly(EMA-co-MMA) bead polymer.

|  | Example 1 | Example 2 | Example 3 | Example 4 | Comparative Example A | Comparative Example B |
|---|---|---|---|---|---|---|
| Mix Ratio solid(g):liquid(g) | 10 g/7 g | 10 g/6.2 g | 10 g/6 g | 10 g/5 g | 10 g/6 g | 10 g/6 g |
| End of pour time, minutes | 8 | 6 | 6 | 3.5 | 3 | 3 |
| Set time, minutes | 22 | 16.5 | 16 | 11.5 | 11.5 | 10 |
| Amount of trapped bubbles | + | + | + | ○ | ○ | ○ |
| Shore D hardness | 72 | 75 | 80 | 82 | 75 | 76 |

| | Appearance in terms of amount of trapped bubbles relative to control mounts (comparative examples A and B) |
|---|---|
| ++ | Significant reduction over comparative examples A and B |
| + | Marked reduction over comparative examples A and B |
| ○ | As per comparative examples A and B |
| − | Marked increase over comparative examples A and B |
| −− | Significant increase over comparative examples A and B |

Comparison of example 3 with comparative examples A and B shows that an acrylic mount with a marked reduction in trapped bubbles and higher Shore D hardness can be prepared using the monomer liquid based on iBoMA.

Examples 5 to 8

The following examples show the effect of increasing the amount of DHEPT accelerator on the set time and other properties.

The acrylic polymer solid used for examples 5 to 8 was the same as in examples 1 to 4.

The acrylic monomer liquid used for examples 5 to 8 varied in the amount of N,N-dihydroxyethyl-p-toluidine (DHEPT) accelerator from 1.25 wt % to 2.50 wt %. The compositions are listed in the following table. 7 g of each acrylic monomer liquid was used to mix with 10 g of the poly(EMA-co-MMA) bead polymer.

The results show that the set time reduces with increasing amount of DHEPT accelerator as expected. However, an additional benefit was noted in that the shore D hardness also increased with increasing amount of DHEPT.

|  |  | Example 5 | Example 6 | Example 7 | Example 8 |
|---|---|---|---|---|---|
| Monomer liquid composition | iBoMA (wt %) | 88.75 | 88.25 | 88.00 | 87.50 |
|  | TEGDMA (wt %) | 10.00 | 10.00 | 10.00 | 10.00 |
|  | DHEPT (wt %) | 1.25 | 1.75 | 2.00 | 2.50 |
|  | Mix Ratio solid (g):liquid (g) | 10 g/7 g | 10 g/7 g | 10 g/7 g | 10 g/7 g |
|  | End of pour time, minutes | 8 | 8 | 6 | 7 |
|  | Set time, minutes | 22 | 16 | 15 | 12 |
|  | Amount of trapped bubbles | + | + | + | + |
|  | Shore D hardness | 72 | 75 | 75 | 86 |

Examples 9 to 11

The following examples show the effect of increasing the amount of TPGDMA crosslinker in the acrylic monomer liquid The acrylic polymer solid used for examples 9 to 11 was the same as in examples 1 to 4.

The acrylic monomer liquid used for examples 9 to 11 varied in the amount of triethylene glycol dimethacrylate (TEGDMA) crosslinker from 10 wt % to 20 wt %. The compositions are listed in the following table. 7 g of each acrylic monomer liquid was used to mix with 10 g of the poly(EMA-co-MMA) bead polymer.

The results show that increasing the amount of TEGDMA crosslinker to 15 wt % and 20 wt % leads to reduced set time and increased hardness. Example 10 with 15 wt % TEGDMA crosslinker also showed a significant reduction in the number of trapped bubbles in the casting compared to comparative example B.

|  |  | Example 9 | Example 10 | Example 11 |
|---|---|---|---|---|
| Monomer liquid composition | iBoMA (wt %) | 88.75 | 83.75 | 78.75 |
|  | TEGDMA (wt %) | 10.00 | 15.00 | 20.00 |
|  | DHEPT (wt %) | 1.25 | 1.25 | 1.25 |
|  | Mix Ratio solid (g):liquid (g) | 10 g/7 g | 10 g/7 g | 10 g/7 g |
|  | End of pour time, minutes | 8 | 7 | 7 |
|  | Set time, minutes | 22 | 13 | 13 |
|  | Amount of trapped bubbles | + | ++ | + |
|  | Shore D hardness | 72 | 82 | 82 |

Examples 12 to 14

The following examples show the effect of varying the identity of the monofunctional monomer containing a cyclic group.

The acrylic polymer solid used for examples 12 to 14 was the same as in examples 1 to 4.

The acrylic monomer liquids of examples 12 to 14 used iBoMA, cyclohexyl methacrylate (CHMA) and tetrahydrofurfuryl methacrylate (THFMA), respectively, as the monofunctional monomer containing cyclic group in conjunction with triethylene glycol dimethacrylate (TEGDMA) crosslinker. The compositions are listed in the following table. 7 g of each acrylic monomer liquid was used to mix with 10 g of the poly(EMA-co-MMA) bead polymer.

The results show that use of CHMA or THFMA as the monofunctional monomer containing a cyclic group gives further enhancements in Shore D hardness.

|  |  | Example 12 | Example 13 | Example 14 |
|---|---|---|---|---|
| Monomer liquid composition | iBoMA (wt %) | 88.75 | — | — |
|  | CHMA (wt %) | — | 88.75 | — |
|  | THFMA (wt %) | — | — | 88.75 |
|  | TEGDMA (wt %) | 10.00 | 10.00 | 10.00 |
|  | DHEPT (wt %) | 1.25 | 1.25 | 1.25 |
|  | Mix Ratio solid (g):liquid (g) | 10 g/7 g | 10 g/7 g | 10 g/7 g |
|  | End of pour time, minutes | 8 | 22 | 6 |
|  | Set time, minutes | 22 | 27 | 25 |
|  | Amount of trapped bubbles | + | + | + |
|  | Shore D hardness | 72 | 85 | 83 |

Examples 15 to 17

The following examples show the effect of varying the identity of the polyfunctional monomer used for crosslinking.

The acrylic polymer solid used for examples 15 to 17 was the same as in examples 1 to 4.

The acrylic monomer liquid of examples 15 to 17 contained iBoMA as the monofunctional monomer containing cyclic group in conjunction with either triethylene glycol dimethacrylate (TEGDMA), trimethylol propane trimethacrylate (TMPTMA) or ethylene glycol dimethacrylate (EGDMA) as the polyfunctional monomer used as crosslinker. The compositions are listed in the following table. 7 g of each acrylic monomer liquid was used to mix with 10 g of the poly(EMA-co-MMA) bead polymer.

The results show that use of any of these polyfunctional crosslinking monomers gives a fast setting system (set time <22 minutes) to form a hard mount (Shore D hardness >72) with a lower level of trapped bubbles compared to comparative example A.

|  |  | Example 15 | Example 16 | Example 17 |
|---|---|---|---|---|
| Monomer liquid composition | iBoMA (wt %) | 88.75 | 88.75 | 88.75 |
|  | TMPTMA (wt %) | — | 10.00 | — |
|  | EGDMA (wt %) | — | — | 10.00 |
|  | TEGDMA (wt %) | 10.00 | — | — |
|  | DHEPT (wt %) | 1.25 | 1.25 | 1.25 |
|  | Mix Ratio solid (g):liquid (g) | 10 g/7 g | 10 g/7 g | 10 g/7 g |
|  | End of pour time, minutes | 8 | 9 | 8 |
|  | Set time, minutes | 22 | 17 | 15 |
|  | Amount of trapped bubbles | + | + | + |
|  | Shore D hardness | 72 | 75 | 74 |

Examples 18 to 20

The following examples extend the series of experiments shown in examples 9 to 11 to show the effect of further increasing the amount of TPGDMA crosslinker in the acrylic monomer liquid.

The acrylic polymer solid used for examples 9 to 11 and 18 to 20 was the same as in examples 1 to 4.

The acrylic monomer liquid used for examples 9 to 11 and 18 to 20 varied in the amount of triethylene glycol dimethacrylate (TEGDMA) crosslinker from 10 wt % to 40 wt %. The compositions are listed in the following table. 7 g of each acrylic monomer liquid was used to mix with 10 g of the poly(EMA-co-MMA) bead polymer.

The results show that increasing the amount of TEGDMA crosslinker to 15 wt % and 20 wt % leads to reduced set time and increased hardness. Example 10 with 15 wt % TEGDMA crosslinker also showed a significant reduction in the number of trapped bubbles in the casting compared to comparative example B. However, further increase in the amount of TEGDMA crosslinker from 25 wt % to 40 wt % leads to no further reduction in set time and Shore D hardness is reduced. These results show that the optimum balance of properties (fewest trapped bubbles, lowest set time and highest Shore D hardness) is achieved by example 10 with 15% wt TEGDMA crosslinker.

Example 21

This example demonstrates the successful preparation of cold mounting specimens for examination by microscope.

The following specimens were placed in separate mounting cups (25 mm diameter and 20 mm deep) and the two-part cold curing composition prepared according to example 3 was poured into the moulding cups to encapsulate each specimen. The liquid was allowed to harden around the specimens before releasing the mounted metallography sample from the mould for further preparation.

1. 20 mm long stainless steel bolt with 13 mm hexagonal head and 8 mm diameter shaft
2. Stainless steel nut screwed onto a stainless steel bolt of 12 mm length
3. Piece of veined sandstone chipping approximately 20 mm long and 4 mm depth
4. Printed circuit board of 15 mm square All samples wetted out well and had good adhesion. The Shore D hardness of all samples was 80, the same as example 3 without the encapsulated specimens.

The mount containing specimen number 2 was selected for further preparation work using a Carlo de Giorgi Polishing/Grinding lathe. The specimen surface was firstly ground to a smooth finish using a grinding wheel and then polished to a final finish ready for microscopic examination using a calico polishing mop with polishing compound.

Example 22

This example demonstrates the use of a barbituric acid compound in combination with a transition metal salt as polymerisation activator or accelerator.

An acrylic polymer solid was prepared by mixing 99.5 wt % of the poly(EMA-co-MMA) copolymer of examples 1 to 4 with 0.5 wt % 1-benzyl 5-phenylbarbituric acid. An acrylic monomer liquid was prepared by mixing 79.99 wt % isobornyl methacrylate (iBoMA), 20 wt % triethylene glycol dimethacrylate (TEGDMA) and 0.01 wt % copper acetyl acetonoate (CuAcAc). 7 g of the acrylic monomer liquid was used to mix with 10 g of the acrylic polymer solid according to the preparative method to prepare an acrylic casting for assessment of appearance and Shore D hardness and also determine end of pour time and set time.

|  |  | Example 9 | Example 10 | Example 11 | Example 18 | Example 19 | Example 20 |
|---|---|---|---|---|---|---|---|
| Monomer liquid composition | iBoMA (wt %) | 88.75 | 83.75 | 78.75 | 73.75 | 63.75 | 58.75 |
|  | TEGDMA (wt %) | 10.00 | 15.00 | 20.00 | 25.00 | 35.00 | 40.00 |
|  | DHEPT (wt %) | 1.25 | 1.25 | 1.25 | 1.25 | 1.25 | 1.25 |
|  | Mix Ratio solid(g):liquid(g) | 10 g/7 g | 10 g/7 g | 10 g/7 g | 10 g/7 g | 10 g/7 g | 10 g/7 g |
|  | End of pour time, minutes | 8 | 7 | 7 | 7 | 7 | 7.5 |
|  | Set time, minutes | 22 | 13 | 13 | 14 | 13 | 13 |
|  | Amount of trapped bubbles | + | ++ | + | + | + | + |
|  | Shore D hardness | 72 | 82 | 82 | 75 | 75 | 75 |

The results are tabulated below. Comparison of example 22 with comparative examples A and B shows that an acrylic mount with a significant reduction in yellow colour, a marked reduction in trapped bubbles and higher Shore D hardness can be prepared using a monomer liquid containing a polymerisation activator or accelerator based on a barbituric acid compound in combination with a transition metal salt.

|  | Example 22 |
| --- | --- |
| Mix Ratio solid (g):liquid (g) | 10 g/7 g |
| End of pour time, minutes | 5 |
| Set time, minutes | 12 |
| Amount of trapped bubbles | + |
| Yellow colour | ++ |
| Shore D hardness | 82 |

| Appearance in terms of amount of trapped bubbles and yellow colour relative to control mounts (comparative examples A and B) | |
| --- | --- |
| ++ | Significant reduction over comparative examples A and B |
| + | Marked reduction over comparative examples A and B |
| o | As per comparative examples A and B |
| − | Marked increase over comparative examples A and B |
| −− | Significant increase over comparative examples A and B |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A multi-part acrylic cold curing composition for metallography moulds to produce a metallography mount comprising:
a storage stable solid part and a storage stable liquid part, the parts being operable to form a mixture which polymerizes to a solid mass upon mixing of the parts together, the solid part comprising polymer powder and initiator and the liquid part comprising acrylic monomer and optionally activator or accelerator, the initiator component being present in an amount effective to polymerize the acrylic monomer upon being mixed with the liquid part, wherein:
the acrylic monomer comprises a cyclic ester side group containing monofunctional acrylic monomer, the cyclic ester side group containing monofunctional acrylic monomer comprises between 70 and 96% w/w of the total monomers in the uncured composition,
wherein the ratio of solid to liquid part is 1:0.8 to 2.5:1 by weight, and
wherein the initiator and optional accelerator are present in an amount that gives a set time of from 5 to 30 minutes.

2. A multi-part acrylic cold curing composition for metallography moulds to produce a metallography mount comprising:
a storage stable solid part and a storage stable liquid part, the parts being operable to form a mixture which polymerizes to a solid mass upon mixing of the parts together, the solid part comprising polymer powder and initiator and the liquid part comprising acrylic monomer and optionally activator or accelerator, the initiator component being present in an amount effective to polymerize the acrylic monomer upon being mixed with the liquid part, wherein:
the acrylic monomer comprises a cyclic ester side group containing monofunctional acrylic monomer, the liquid part comprises a mixture of monofunctional monomer(s) and polyfunctional monomer(s), and
wherein the polyfunctional monomers comprise between 12 and 22% w/w of the total monomers in the uncured composition,
wherein the ratio of solid to liquid part is 1:08 to 2.5:1 by weight, and
wherein the initiator and optional accelerator are present in an amount that gives a set time of from 5 to 30 minutes.

3. A solid metallography mount produced from mixing a multi-part acrylic composition according to claim 1.

4. A multi-part cold curing pack for metallography moulds to produce a metallography mount comprising a first container and a second container, the content of the said first and second containers being in accordance with the solid and liquid parts according to claim 1.

5. A solid metallography mount comprising an acrylic polymer at least partially formed from a cyclic ester side group containing monofunctional acrylic monomers according to claim 1.

6. A mount according to claim 5, comprising a further polymer, wherein at least one monomer comprising the cyclic ester side group containing monofunctional acrylic monomer, forming the acrylic polymer is not present in the monomer(s) forming the further polymer.

7. A cold curing composition according to claim 1 for use as a cold mounting metallography moulding composition to produce metallography mounts.

8. A composition according to claim 1, wherein a cyclic ester side group containing monofunctional acrylic monomer is a methacrylate monomer.

9. A composition according to claim 1, wherein the cyclic ester side group containing monofunctional acrylic monomer is selected from one or more cyclic aliphatic ester methacrylate monomers and/or aryl ester methacrylate monomers.

10. A composition according to claim 9, wherein the cyclic aliphatic ester methacrylate monomers are selected from one or more of cyclohexyl methacrylate, isobornyl methacrylate, dicyclopentenyl methacrylate, dihydrodicyclopentadienyl methacrylate, adamantyl methacrylate, 4-t- butylcyclohexyl methacrylate, 3,3,5-trimethylcyclohexyl methacrylate and tetrahydrofurfuryl methacrylate.

11. A composition according to claim 9, wherein the cyclic aliphatic ester methacrylate monomers are selected from one or more of cyclohexyl methacrylate, isobornyl methacrylate, dicyclopentenyl methacrylate, dihydrodicyclopentadienyl methacrylate, adamantyl methacrylate, 4-t-butylcyclohexyl methacrylate, and 3,3,5-trimethylcyclohexyl methacrylate.

12. A composition according to claim 9, wherein the aryl ester methacrylate monomers are selected from one or more of benzyl methacrylate, 2-phenoxyethylmethacrylate and phenyl methacrylate.

13. A composition according to claim 1, wherein the monofunctional monomer used in the storage stable liquid part or monofunctional monomer residues of the acrylic polymer comprise a mixture of more than one monofunctional acrylic monomer or residue thereof.

14. A composition according to claim 1, wherein the acrylic monomer component comprises between 80 and 100% w/w of the storage stable liquid part or wherein acrylic monomers form between 80 and 100% w/w of the acrylic polymer.

15. A composition according to claim 1, wherein the activator or accelerator comprises between 0 and 10% w/w of the storage stable liquid part.

16. A composition according to claim 1, wherein the storage stable liquid part monomer component or acrylic polymer comprises a polyfunctional monomer or residue thereof in addition to a monofunctional monomer or residue thereof and such polyfunctional monomer has at least two polymerizable double bonds per molecule.

17. A composition according to claim 16, wherein bifunctional monomers of the polyfunctional monomer include: ethylene glycol dimethacrylate, hexanediol dimethacrylate, tripropylene glycol dimethacrylate, butanediol dimethacrylate, neopentyl glycol dimethacrylate, diethylene glycol dimethacrylate, triethylene glycol dimethacrylate, dipropylene glycol dimethacrylate, allyl methacrylate, divinyl benzene and substituted analogues thereof; and
trifunctional monomers of the polyfunctional monomer include: tripropylene glycol trimethacrylate, trimethylol propane trimethacrylate, pentaerythritol trimethacrylate; tetrafunctional monomers of the polyfunctional monomer include pentaerythritol tetramethacrylate, and
hexafunctional monomers of the polyfunctional monomer include dipentaerythritol hexamethacrylate.

18. A composition according to claim 16, wherein a mixture of more than one polyfunctional monomer is used.

19. A composition according to claim 1, wherein storage stable the liquid part or acrylic polymer comprises a mixture of monofunctional monomer(s) and polyfunctional monomer(s) or residues thereof.

20. A compound according to claim 1, wherein the ratio of monofunctional monomers or residues thereof to polyfunctional monomers or residues thereof in the storage stable liquid part or acrylic polymer is between 95:5 wt % and 70:30 wt %.

21. A composition according to claim 1, wherein the polymer powder is selected from a polymer or copolymer having >100 monomer residue units.

22. A composition according to claim 1, wherein the polymer powder is a homopolymer of a polyalkyl(alk)acrylate or (alk)acrylic acid or copolymer of a polyalkyl (alk)acrylate or (alk)acrylic acid with one or more other vinyl monomers.

23. A composition according to claim 1, wherein the polymer powder is in bead form having a mean particle size of between 10 microns and 800 microns.

24. A composition according to claim 1, wherein the polymer powder comprises between 60 and 99.9% w/w of the solid part.

25. A composition according to claim 1, wherein the initiator comprises between 0.1 and 15 w/w of the solid part.

26. A composition according to claim 1, wherein other monofunctional monomers or residues thereof are not present in the storage stable liquid part of the composition or the acrylic polymer.

27. A composition according to claim 26, wherein ethyl methacrylate monofunctional monomers or residues thereof are not present in the storage stable liquid part of the composition or acrylic polymer thereof.

28. A composition according to claim 1, further comprising a polymerization activator or accelerator selected from a barbituric acid compound present in the storage stable solid part in combination with a transition metal salt present in the liquid part.

29. A composition according to claim 28, wherein the polymerization activator or accelerator comprises 0.1 wt % to 2.0 wt % of barbituric acid compound in the solid part and 0.005 wt % to 0.05 wt % of copper compound dissolved in the liquid part.

30. A process of producing a metallography mount comprising the steps of:
mixing a storage stable solid part and a storage stable liquid part together to form a liquid or semi-solid paste: the solid part comprising polymer powder and initiator and the liquid part comprising acrylic monomer and optionally activator or accelerator, the initiator component being present in an amount effective to polymerize the acrylic monomer upon being mixed with the liquid part
pouring the liquid or semi-solid paste into a mould containing a metallography sample to be analysed to at least partially encapsulate the sample:
allowing the liquid or semi-solid paste to harden around the sample: and
optionally, releasing the mounted metallography sample from the mould for analysis or further preparation, wherein:
the acrylic monomer comprises a cyclic ester side group containing monofunctional acrylic monomer, the cyclic ester side group containing monofunctional acrylic monomer comprises between 70 and 96% w/w of the total monomers in the uncured composition,
wherein the ratio of solid to liquid part is 1:0.8 to 2.5:1 by weight, and wherein the minutes.

31. A process of producing a metallography mount comprising the steps of:
mixing a storage stable solid part and a storage stable liquid part together to form a liquid or semi-solid paste, the solid part comprising polymer powder and initiator and the liquid part comprising acrylic monomer and optionally activator or accelerator, the initiator component being present in an amount effective to polymerize the acrylic monomer component upon being mixed with the liquid part:
pouring the liquid or semi-solid paste into a mould containing a metallography sample to be analysed to at least partially encapsulate the sample:
allowing the liquid or semi-solid paste to harden to form a solid mass around the sample: wherein:

the acrylic monomer component comprises a cyclic ester side group containing monofunctional acrylic monomer, wherein the liquid part comprises a mixture of monofunctional monomer(s) and polyfunctional monomer(s), and wherein the polyfunctional monomers comprise between 12 and 22% w/w of the total monomers in the uncured composition: and optionally, releasing the mounted metallography sample from the mould for analysis or further preparation, wherein the ratio of solid to liquid part is 1:0.8 to 2.5:1 by weight, and wherein the initiator and optional accelerator are present in an amount that gives set time of from 5 to 30 minutes.

32. A solid metallography mount produced from mixing a multi-part acrylic cold curing composition according to claim 2.

33. A solid metallography mount comprising an acrylic polymer at least partially formed from a cyclic ester side group containing monofunctional acrylic monomers according to claim 2.

* * * * *